United States Patent
Deponte et al.

(10) Patent No.: US 9,680,178 B2
(45) Date of Patent: Jun. 13, 2017

(54) RESTRAINING OF BATTERY CELLS BY WAY OF A CAMBERED DESIGN OF THE BATTERY HOUSING

(71) Applicant: Robert Bosch GmbH, Stuttgart (DE)

(72) Inventors: Rene Deponte, Sersheim (DE); Markus Feigl, Markgroeningen (DE); Andreas Eichendorf, Stuttgart (DE); Oliver Gerundt, Friolzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 149 days.

(21) Appl. No.: 14/421,997

(22) PCT Filed: Jun. 26, 2013

(86) PCT No.: PCT/EP2013/063370
§ 371 (c)(1),
(2) Date: Feb. 16, 2015

(87) PCT Pub. No.: WO2014/026793
PCT Pub. Date: Feb. 20, 2014

(65) Prior Publication Data
US 2015/0214570 A1    Jul. 30, 2015

(30) Foreign Application Priority Data

Aug. 14, 2012   (DE) ........................ 10 2012 214 443

(51) Int. Cl.
*H01M 10/04*   (2006.01)
*H01M 2/10*    (2006.01)
(Continued)

(52) U.S. Cl.
CPC ..... *H01M 10/0481* (2013.01); *H01M 2/0237* (2013.01); *H01M 2/1016* (2013.01);
(Continued)

(58) Field of Classification Search
None
See application file for complete search history.

(56) References Cited

U.S. PATENT DOCUMENTS

| | | | |
|---|---|---|---|
| 2003/0003350 A1* | 1/2003 | Heimer | H01M 2/1077 429/99 |
| 2007/0018610 A1* | 1/2007 | Wegner | H01M 2/0212 320/112 |

(Continued)

FOREIGN PATENT DOCUMENTS

| | | |
|---|---|---|
| CN | 201242583 Y | 5/2009 |
| EP | 2466679 | 6/2012 |

(Continued)

OTHER PUBLICATIONS

International Search Report for Application No. PCT/EP2013/063370 dated Oct. 15, 2013 (English Translation, 2 pages).

*Primary Examiner* — Ula C Ruddock
*Assistant Examiner* — Matthew Van Oudenaren
(74) *Attorney, Agent, or Firm* — Michael Best & Friedrich LLP

(57) ABSTRACT

The invention relates to a battery cell (1) for pre-stressed battery modules (13). The invention further relates to corresponding pre-stressed battery modules (13) and corresponding production methods. The battery cell (1) has a cell housing (3) and a chemicals carrier (9). The chemicals carrier (9) is arranged in the cell housing (3). The cell housing (3) has a bulging design.

10 Claims, 4 Drawing Sheets

(51) Int. Cl.
  *H01M 2/16* (2006.01)
  *H01M 2/14* (2006.01)
  *H01M 2/02* (2006.01)

(52) U.S. Cl.
  CPC ........... *H01M 2/1077* (2013.01); *H01M 2/14* (2013.01); *H01M 2/16* (2013.01); *H01M 2/1653* (2013.01); *H01M 2/0202* (2013.01); *H01M 2002/0205* (2013.01); *Y10T 29/4911* (2015.01); *Y10T 29/49108* (2015.01); *Y10T 29/49115* (2015.01)

(56) References Cited

U.S. PATENT DOCUMENTS

| | | | | |
|---|---|---|---|---|
| 2009/0035652 | A1* | 2/2009 | Freitag | H01M 2/02 429/176 |
| 2011/0052975 | A1* | 3/2011 | Lee | H01M 2/0237 429/178 |
| 2011/0070476 | A1* | 3/2011 | Takahashi | H01G 9/0003 429/120 |
| 2011/0262797 | A1* | 10/2011 | Kim | H01M 2/1077 429/149 |
| 2011/0293998 | A1* | 12/2011 | Sato | H01M 2/1077 429/159 |
| 2012/0103714 | A1* | 5/2012 | Choi | B60K 1/04 180/68.5 |

FOREIGN PATENT DOCUMENTS

| | | | |
|---|---|---|---|
| GB | 1428132 | | 3/1976 |
| JP | 2001126677 | * | 5/2001 |

\* cited by examiner

RESTRAINING OF BATTERY CELLS BY WAY OF A CAMBERED DESIGN OF THE BATTERY HOUSING

BACKGROUND OF THE INVENTION

Batteries are employed in many sectors of technology. A plurality of individual batteries may be combined so as to form a module. A plurality of modules may furthermore be joined together so as to form a so-called battery pack. High-performance batteries, for example high-voltage batteries, are created in this manner.

The battery cells are usually implemented so as to be rectangular or cuboid. In order to ensure improved manageability and in order to provide as large an amount of energy as possible in as small a volume as possible, the rectangular battery cells are restrained or prestressed so as to form modules. Furthermore, restraining contributes to an increase in the lifespan of the batteries.

In order to restrain or prestress the batteries in relation to one another, an elastic element is required here in the chain of the distribution of forces, for example in order to compensate for tolerances of the individual battery cells or of the paintwork and insulation, for example. The battery cells here are usually placed beside one another. Subsequently, springs or pre-bent metal plates, respectively, are disposed on the outer sides, for example on the right and left. The metal plates act as leaf springs, for example, and are compressed up to a specific pre-tensioning force. In order to maintain the tension between the leaf springs, the leaf springs are connected to so-called pull plates, for example. In order to achieve a uniform distribution of compression across the battery cells, steel plates are inserted between the resilient metal plates and the battery cells. The pull plates are also usually made of steel, in order to distribute the high forces in a uniform manner.

SUMMARY OF THE INVENTION

Therefore, there may be demand for an improved battery cell, an improved prestressed battery module and for corresponding manufacturing methods which enable a design of a prestressed battery module which is reduced in weight and optionally more cost-effective.

In the following, features, details and potential advantages of a device according to the embodiments of the invention are discussed in detail.

According to a first aspect of the invention, a battery cell for prestressed battery modules is proposed. The battery cell includes a cell housing and at least one chemicals carrier. The chemicals carrier here is disposed in the cell housing. The cell housing is implemented so as to be cambered.

In other words, the concept of the present invention is based on providing a battery cell of which the cell housing is outwardly curved in a convex manner and thereby is configured so as to be deformable and, up to a certain degree, compressible or elastic, respectively. In this manner, the function of the resilient metal plates described above is transferred to the individual battery cells. On account thereof, at least two weight-intensive components, namely the resilient metal plates, for example, may be dispensed with. In this manner, both weight and also costs are saved. Furthermore, on account of the cambered implementation of the cell housing and by dispensing with resilient metal plates on the sides of a battery module, a smaller longitudinal tolerance has to be adhered to than is the case with resilient metal plates. The longitudinal tolerance of a battery module having battery cells according to the invention now only corresponds to the tolerance of a press used in the assembly of a module. Thus, a tighter longitudinal tolerance may be adhered to for an entire battery pack having a plurality of modules. On account thereof, installation space for battery modules or battery packs, respectively, in a vehicle, for example, may be reduced.

The battery cell, the prestressed battery module and a battery pack composed of prestressed battery modules may be employed in electric or hybrid vehicles, for example.

The battery cell may preferably be implemented as a lithium-ion battery cell. The battery cell may furthermore be implemented as a lead battery, as a nickel-hydrogen battery, as a nickel-iron battery, as a lithium-polymer battery, as a lithium-metal battery, as a lithium-manganese battery, as a lithium-titanium battery, as a lithium-sulfur battery, as a silver-zinc battery, or as a zinc-bromide battery.

The cell housing may also be referred to as a "can" and may include a metallic material, for example. The cell housing may be made of deep-drawn aluminum, in particular. One or more chemicals carrier(s) is/are disposed in the cell housing. The chemicals carriers may be referred to as "jelly rolls", for example. The chemicals carriers here may include an anode material and a cathode material. The anode material and the cathode material may be implemented as foils, for example, which are provided with various layers and are wound so as to be on top of one another.

The cell housing is implemented so as to be cambered, that is to say that at least one cell wall is outwardly curved. Furthermore, all cell walls may be outwardly curved. Additionally, the cell base may furthermore be outwardly curved. Cambering of the cell housing may be carried out prior to or after insertion of the chemicals carriers into the cell housing. On account of cambering, the cell housing is deformable or compressible, respectively, such that, even without the resilient metal plates, elastic elements are present in the chain of the distribution of forces of a battery module.

Cambering may be in such a manner, for example, that the cell housing on each side has an elevation or curvature, respectively, of up to 2 mm, for example in relation to a plane intersecting the corner points of the battery cell. In other words, the thickness of the cell housing may increase in the cross section by up to 4 mm on account of cambering.

According to an exemplary embodiment of the invention, the battery cell includes an expanded foam material which is disposed between the cell housing and the chemicals carrier. The expanded foam material is an elastic or deformable and compressible material, respectively, which includes plastics material or a composite material, for example. The expanded foam material may include a cellular structure and a low material density. The expanded foam material may furthermore include high thermal conductivity. The expanded foam material here may be expanded in a physical, chemical, or mechanical manner, for example.

The expanded foam material may in particular be selected such that it reacts as little as possible with the chemicals carrier or is resistant thereto, respectively. Furthermore, the expanded foam material may contribute toward uniformly distributing the pressure which, on account of restraining, acts on the battery cell.

According to a further exemplary embodiment of the invention, the expanded foam material includes polypropylene. The polypropylene may have the chemical structural formula $C_3H_6$ and be implemented as a partially crystalline thermoplastic material. The density of the polypropylene material here is between 0.895 $g/cm^3$ and 0.92 $g/cm^3$, for example. In addition to the polypropylene, the expanded foam material may include mineral materials, such as chalk, or glass fibers.

According to a further exemplary embodiment of the invention, the cell housing includes a housing base and a housing wall. The housing base and the housing wall here are outwardly curved in a convex manner. In particular, the cell housing may be implemented having an angular or round or oval cross section. Where the cell housing is implemented with an angular cross section, each individual housing wall may be outwardly curved.

According to a second aspect of the invention, a prestressed battery module is proposed. The prestressed battery module, which is also referred to as a restrained battery module, includes at least two battery cells as described above. The battery module furthermore includes a rigid module frame which has smaller dimensions than the overall number of cambered battery cells to be disposed in the module frame. The battery cells here are inserted into the module frame in such a manner that, on account of their camber, said battery cells are pressed against one another and that optionally the camber is compressed.

Between 5 and 13 battery cells may in particular be combined in one battery module. Here, cambered battery cells according to the invention may optionally be restrained with commercially available battery cells in one battery module. Furthermore, only battery cells according to the invention, having a cambered cell housing, may be provided in the prestressed battery module.

The module frame here is implemented so as to be rigid. That is to say that the module frame is more rigid or less compressible, respectively, than the cambered cell housing. The battery cells may be pressed against one another during insertion or already prior to insertion into the module frame and the cambered housing may be compressed in such a manner that the battery cells fit into the module frame. The battery cells subsequently maintain this shape on account of the smaller dimension of the module frame and of the pressure exerted thereby.

An individual cambered battery cell may have a thickness of 49 mm, for example. If the battery cell is disposed in the rigid module frame and is pressed against the other battery cells, the former now has a thickness of only approximately 45 mm. In other words, cambering of the battery cells may be flattened once the latter are pressed against one another and are inserted into the module frame. On account thereof, the battery cells in the module frame exert a restraining force in relation to one another.

According to a further exemplary embodiment of the invention the module frame includes a metal and/or a composite material. In particular, the end plates of the module frame may include a metal and/or a composite material. The metal here may be steel and, in particular, stainless steel, for example. The metal may furthermore be an aluminum. The composite material may include any materials. In particular. The composite material may be a chromium-nickel steel 1.45510 having polyamide and glass fibers. The glass fibers here correspond to 30% of the polyamide (PA 6.6-30% GF), for example.

According to a further exemplary embodiment of the invention, the module frame includes at least two end plates and at least two pull plates. The pull plates here are connected to the end plates in such a manner that the end plates exert pressure on the battery cells. If the module frame is implemented so as to be cuboid, two plates which lie opposite one another may be implemented as end plates. The remaining four sides may furthermore be implemented as pull plates. The pull plates may be connected to the end plates in a materially integral, a form-fitting, or a force-fitting manner. The pull plates may in particular be welded, screwed or adhesively bonded to the end plates. The pull plates may furthermore be fixed to the end plates with the aid of straps.

According to a third aspect of the invention, a method for manufacturing a cambered battery cell as described above is proposed. The method includes the following steps: providing a cell housing; disposing one or more chemicals carriers in the cell housing; and cambering of the cell housing. The method steps may be carried out in any order. For example, the cell housing may first be cambered. Thereafter, the chemicals carriers may be inserted into the cell housing. Alternatively, the chemicals carriers may initially be inserted into the cell housing. Cambering the cell housing may take place thereafter.

According to a further exemplary embodiment of the invention, cambering the cell housing takes place by filling a medium into the interior of the cell housing. The medium here is selected from the following group of media: a compressed gas, an expanded foam material, or a composite material. The compressed gas may be air, for example, which is filled into the cell housing under a pressure which is higher than the atmospheric pressure.

According to a fourth aspect of the invention, a method for manufacturing a prestressed battery module as described above is proposed. The method includes the following steps: providing at least two of the cambered battery cells as described above; providing a rigid module frame which has smaller dimensions than the overall dimension of the cambered battery cells to be inserted into the module frame; and disposing the cambered battery cells in the module frame in such a manner that, on account of their camber, said battery cells are pressed against one another. Disposing the cambered battery cells in the module frame here may furthermore comprise: compressing the cambered battery cells, such that the cambered cell housings are compressed and the battery cells thus can be inserted into the module frame.

According to a further exemplary embodiment of the invention, disposing the cambered battery cells in the module housing furthermore includes: inserting the battery cells laterally into the module housing through a first opening; and closing off the first opening by way of an end plate in such a manner that the cambered battery cells are pressed against one another. In the manufacturing method according to this exemplary embodiment, the cambered battery cells do not have to be pressed against one another prior to insertion into the module housing. The module housing may be closed on five sides by way of one end plate and four pull plates, for example. A second end plate is not yet disposed on the housing, such that a first lateral opening is available. The cambered battery cells can be inserted into the module housing by way of this opening. Thereafter, pressure is exerted on the cambered battery cells, such that the cambered cell housings are compressed and the second end plate can close off the first opening. Thereafter, the second end plate may be welded to the pull plates. The second end plate here may be welded to one or more pull plate(s).

According to a further exemplary embodiment of the invention, disposing the cambered battery cells in the module housing furthermore includes: providing elastic plates laterally on the battery cells; inserting the battery cells into the module housing, from above or from below, through a second opening in such a manner that the cambered battery cells are pressed against one another; and closing off the second opening by way of a pull plate. In the case of this exemplary embodiment, the cambered battery cells are initially provided laterally with elastic plates which include an expanded foam material, for example. Thereafter, the cambered battery cells are compressed, such that the cambered housings are compressed. The cambered battery cells are thereafter inserted into the housing.

The elastic plates here are in each case disposed on the outermost battery cell, for example outside on the right and outside on the left, such that an elastic material is present between the respective battery cell and the end plate of the module housing when the battery cells are disposed in the module housing. The elastic plates here prevent damage to the cambered battery cells and, in particular, to the insulation of the cambered battery cells during insertion into the module housing. The second opening is closed off by way of a pull plate which thereafter may be welded to the further pull plates and/or to the end plates of the module housing.

BRIEF DESCRIPTION OF THE DRAWINGS

Further features and advantages of the present invention will be evident to the person skilled in the art from the following description of exemplary embodiments which, however, are not to be understood to be limiting in any way in relation to the invention, with reference to the appended drawings.

All figures are merely schematic illustrations of devices according to the invention or of their component parts, according to exemplary embodiments of the invention. In particular, spacings and relationships pertaining to size are not reproduced to scale in the figures. In the various figures, corresponding elements are provided with identical reference signs.

DETAILED DESCRIPTION

Figure 1:
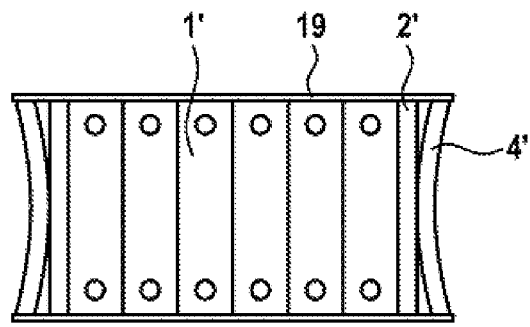
FIG. 1 shows a plan view onto a known prestressed battery module.

In FIG. 1, a plan view onto a known prestressed battery module is illustrated. Known battery cells 1' here are implemented so as to be cuboid. The battery cells 1' are placed beside one another. To the right and left of the outer battery cell 1', spring plates 4' which act in a similar manner to leaf springs are provided. In order to achieve a uniform distribution of pressure on the battery cells 1', pressure distribution plates 2', made of steel, are placed in between the spring plates 4' and the battery cells 1'. The spring plates 4' are compressed up to a specific pre-tension force. In order to maintain the tension, the spring plates 4' are welded or screwed to so-called pull plates 19. The mass of a component having a spring plate 4' and a pressure distribution plate 2' may be approx. 300 g. For example, if eight individual battery modules are combined to form one battery pack, this amounts to a mass of 4.8 kg which is allocated to the pressure distribution plates 2' and the spring plates 4'.

Figure 2A:
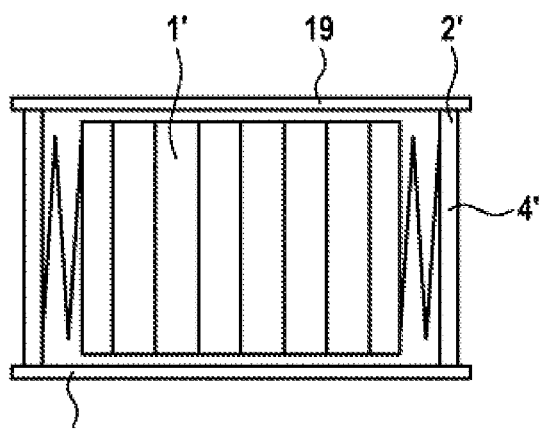
FIG. 2A in a schematic manner shows an equivalent representation of the known restraining principle.

An equivalent representation of the known battery module illustrated in FIG. 1 is shown in FIG. 2A. The rigid cuboid battery cells 1' here are disposed as quasi-rigid elements between the pressure distribution plates 2' which are implemented as rigid plates. The pressure distribution plates 2' are pressed against the battery cells 1' by the pre-curved spring plates 4'. A distribution of force is closed by way of the pull plates 19 which are welded or screwed to the spring plates 4'.

Figure 2B:
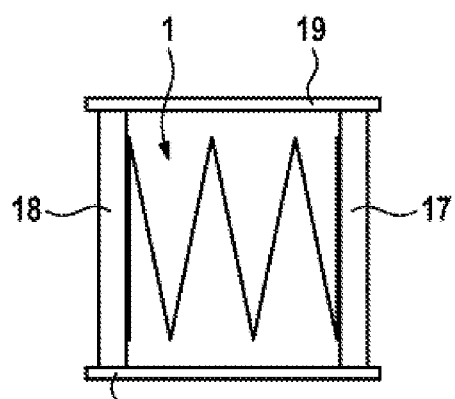
FIG. 2B in a schematic manner shows an equivalent representation of the restraining principle, according to an exemplary embodiment of the invention.

FIG. 2B shows an equivalent representation of the restraining principle, according to an exemplary embodiment of the invention. The battery cells 1 according to the invention are implemented so as to be cambered and, therefore, themselves act as resilient elements. That is to say that the battery cells 1 have targeted elasticity. In particular, the function of the spring plates 4', that is to say an application of force and a compensation of tolerances, is transferred to the cambered battery cell 1. The battery cells 1 here are clamped between rigid end plates 17, 18. The end plates 17, 18 here are welded or screwed to pull plates 19, and form a rigid module frame. In this manner, a resilient additional component, in particular the spring plates 4', can be dispensed with. On account thereof, both costs and also weight are saved. Furthermore, the longitudinal tolerance of a prestressed battery module is improved. The longitudinal tolerance of the prestressed battery module, in particular, corresponds to a tolerance of the press used in the assembly of the module. On account of the adherence to tighter longitudinal tolerances, installation space in a vehicle, for example, in which the prestressed battery module is installed, may be saved.

Figure 3:
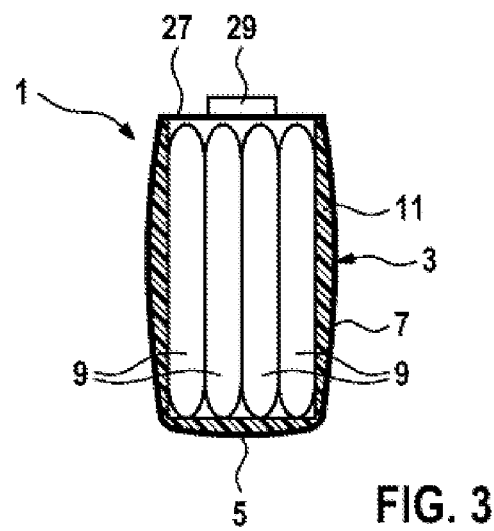
FIG. 3 shows a cross section through a cambered battery cell, according to an exemplary embodiment of the invention.

FIG. 3 shows a cross section through a cambered battery cell 1. The battery cell 1 here includes a cell housing 3 in which a chemicals carrier 9 is disposed. The chemicals carrier 9 here may include a plurality of individual jelly rolls. The cell housing 3 here may include a housing base 5, a housing wall 7, and a housing cover 27. Here, a cell terminal 29 is provided on the housing cover 27. The cell terminal 29 here may be a positive or negative terminal post, for example, which is connected to a cathode or anode of the chemicals carrier 9.

The cell housing 3, and in particular the housing wall 7 and the housing base 5, are outwardly curved in a convex manner. The maximum elevation of a housing wall 7 may be up to 2 mm, for example, as compared with the nominal dimension after pressing. An expanded foam material 11, also referred to as a plastic matrix, may be introduced between the housing wall 7 and the chemicals carrier 9. The expanded foam material may uniformly distribute a pressure exerted on account of the restraining of the battery cells on the chemicals carrier 9.

Figure 4A:
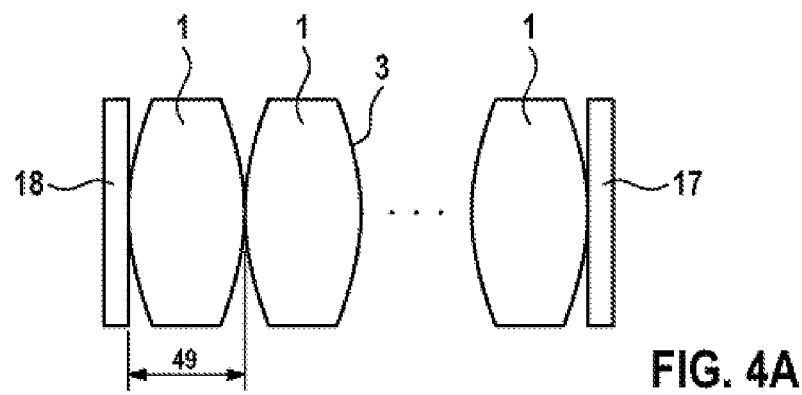
FIG. 4 shows the cambered battery cells prior to restraining.
FIG. 4B shows the cambered battery cells after restraining.
Figure 4B:
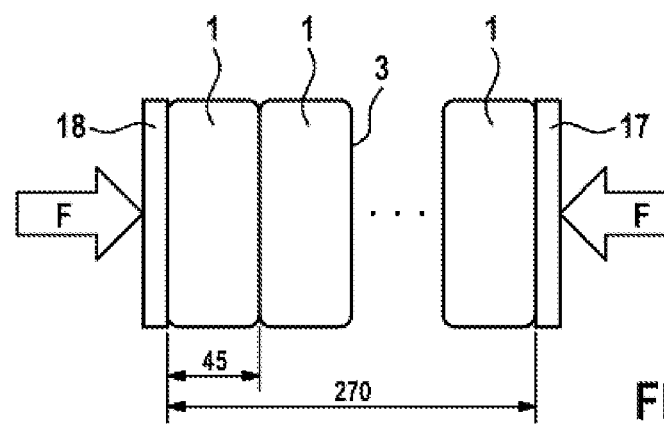

In FIGS. 4A and 4B, the restraining of battery cells 1 using the example of a module having six 63 Ah VDA battery cells, having a nominal thickness of 45 mm, is shown. The battery cells 1 may be placed together with a first rigid end plate 17 and a second rigid end plate 18 into a restraining device. In the cambered state, the batteries each have a thickness or width, respectively, of 49 mm. The end plates 17, 18 in each case have a thickness of 3 mm. This results in an overall module thickness of 300 mm. The battery cells 1 having the end plates 17, 18 are illustrated in FIG. 4A, prior to compressing or restraining, respectively.

FIG. 4B shows the module after restraining. That is to say that a force F is exerted on the end plates 17, 18, such that the cambered cell housing 3 is compressed and the individual battery cells 1 thereafter have a nominal dimension of 45 mm. After pressing, the entire battery module having six battery cells 1 and two end plates 17, 18 has an overall thickness of 276 mm, for example. The tension force here emanates from the battery cells 1 themselves.

Figure 5:
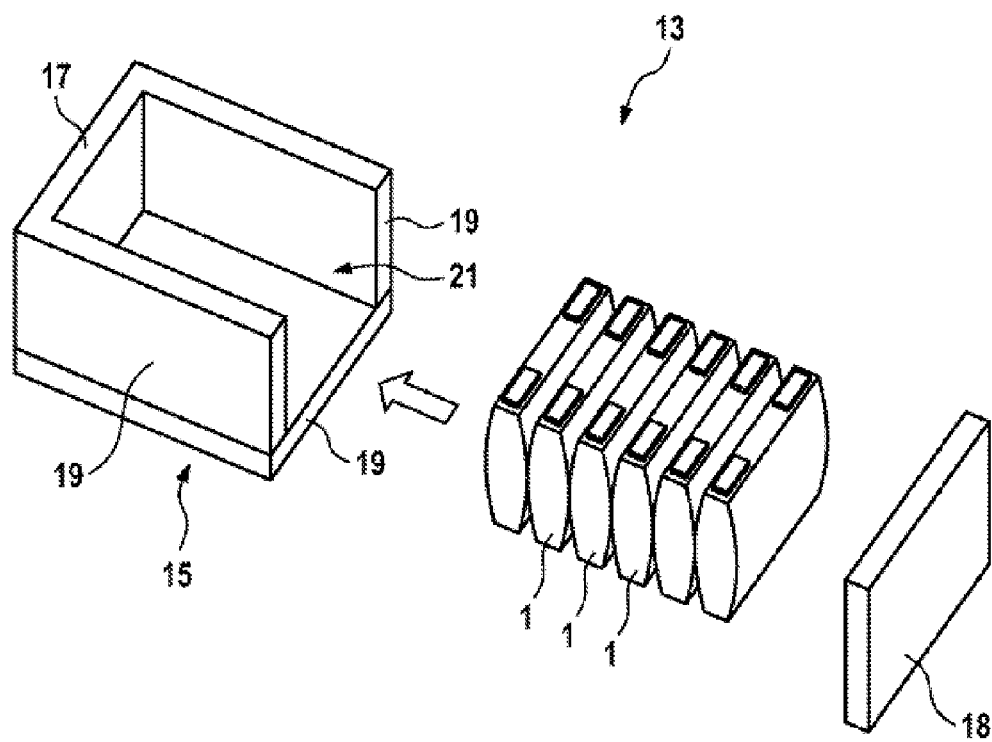
FIG. 5 shows a manufacturing method for a prestressed battery module, according to an exemplary embodiment of the invention.

FIG. 5 shows a manufacturing method for a prestressed battery module 13. In the exemplary embodiment in FIG. 5, a rigid module frame 15 may be assembled and welded in a press. The rigid module frame 15 here may include a first end plate 17 and pull plates 19. On one side, a first opening 21 which can be closed off by way of a second end plate 18 is provided. The individual cambered battery cells 1 may be introduced into the rigid module frame 15 through the first opening 21. The joining direction is indicated by an arrow in FIG. 5. Thereafter, the second end plate 18 may be brought into position and the cambered battery cells 1 may be compressed, such that the second end plate 18 closes off the first opening 21. Furthermore, the second end plate 18 may be welded or screwed into place.

Figure 6:
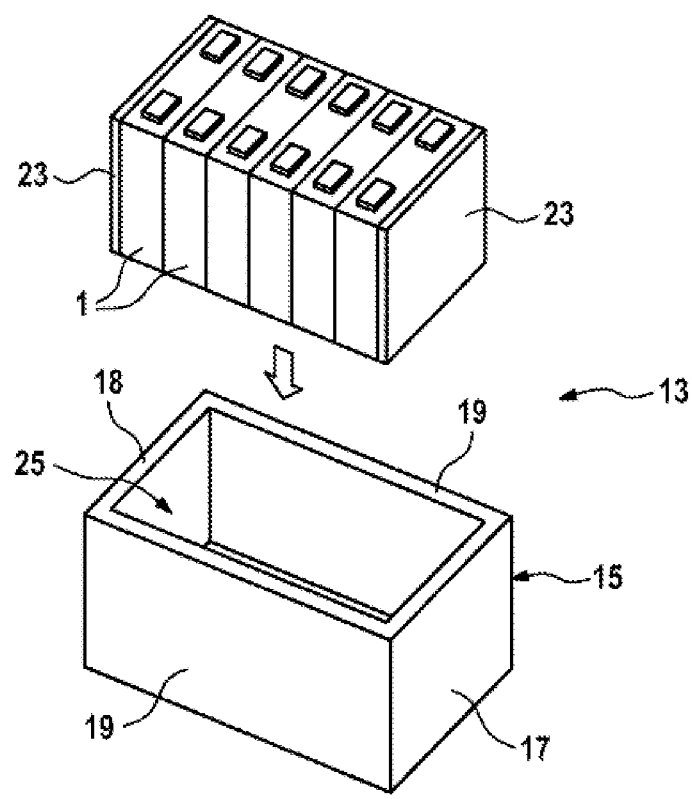
FIG. 6 shows a manufacturing method for a prestressed battery module, according to a further exemplary embodiment of the invention.

FIG. 6 shows a further manufacturing method for a prestressed battery module 13. In the exemplary embodiment in FIG. 6, the rigid module frame 15 may be supplied as a pre-assembled functional group to an assembly line. The cambered battery cells 1 here may initially be disposed beside one another, and an elastic plate 23 may in each case be provided laterally on the right and left. The elastic plate here serves as protection of the battery cells 1 during insertion into the rigid module frame 15. The battery cells 1, together with the elastic plates 23, are pressed against one another and thereafter inserted into the module frame 15, from above in the exemplary embodiment in FIG. 6, through a second opening 25. The joining direction is illustrated by an arrow. The second opening 25 can thereafter be closed off by way of a pull plate 19.

Figure 7:
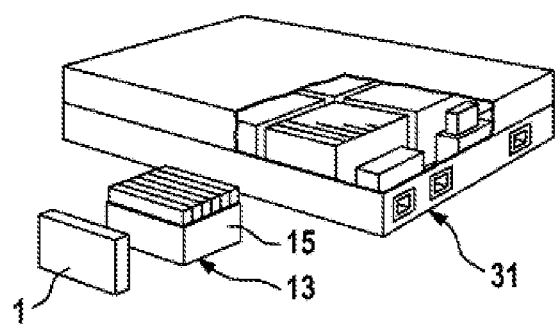
FIG. 7 shows battery modules and a battery pack according to an exemplary embodiment of the invention.

In FIG. 7, a perspective view of a cambered battery cell 1 of a prestressed battery module 13 having a plurality of individual battery cells 1, and furthermore a battery pack 31 having a plurality of individual prestressed battery modules 13 are illustrated.

In closing, it is to be noted that terms such as "including" or similar are not meant to exclude further elements or steps from being provided. It is furthermore noted that "one" or "a" does not exclude a plurality. Moreover, features which are described in conjunction with the various embodiments may be combined with one another in an arbitrary manner. It is furthermore noted that the reference signs in the claims are not be interpreted as limiting the scope of the claims.

What is claimed is:

1. A battery cell (1) for prestressed battery modules (13), the battery cell (1) including
    a cell housing (3);
    a chemicals carrier (9); and
    an expanded foam material (11),
    wherein the chemicals carrier (9) is disposed in the cell housing (3),
    wherein the cell housing (3) is cambered, and
    wherein the expanded foam material (11) is disposed between the cell housing (3) and the chemicals carrier (9).
2. The battery cell (1) as claimed in claim 1 wherein the expanded foam material (11) includes polypropylene.

3. The battery cell (1) as claimed in claim 1,
    wherein the cell housing (3) includes a housing base (5) and a housing wall (7); and
    wherein the housing base (5) and the housing wall (7) are outwardly curved in a convex manner.

4. A prestressed battery module (13), the battery module (13) including
    at least two cambered battery cells (1) as claimed in claim 1; and
    a rigid module frame (15) which has smaller dimensions than the cambered battery cells (1);
    wherein the cambered battery cells (1) are inserted into the rigid module frame (15) in such a manner that, on account of their camber, said battery cells (1) are pressed against one another.

5. The prestressed battery module (13) as claimed in claim 4, wherein the rigid module frame (15) includes at least one of a metal and a composite material.

6. The prestressed battery module (13) as claimed in claim 4,
    wherein the rigid module frame (15) includes at least two end plates (17, 18) and pull plates (19); and
    wherein the pull plates (19) are connected to the end plates (17, 18) in such a manner that the end plates (17, 18) exert pressure on the battery cells (1).

7. A method for manufacturing a cambered battery cell (1) as claimed in claim 1, the method including the following steps:
    providing the cell housing (3);
    disposing the chemicals carrier (9) in the cell housing (3); and
    cambering the cell housing (3), wherein the cambering of the cell housing (3) takes place by filling the cell housing (3) with the expanded foamed material (11).

8. A method for manufacturing a prestressed battery module (13) as claimed in claim 5, the method including the following steps:
    providing the at least two cambered battery cells (1);
    providing the rigid module frame (15) which has smaller dimensions than the cambered battery cells (1); and
    disposing the cambered battery cells (1) in the rigid module frame (15) in such a manner that, on account of their camber, said battery cells (1) are pressed against one another.

9. The method as claimed in claim 8, wherein disposing the cambered battery cells (1) in the rigid module frame (15) furthermore includes:
    inserting the cambered battery cells (1) laterally into the rigid module frame (15) through a first opening (21); and
    closing off the first opening (21) by way of an end plate (18) in such a manner that the cambered battery cells (1) are pressed against one another.

10. The method as claimed in claim 8, wherein disposing the cambered battery cells (1) in the rigid module frame (15) furthermore includes:
    providing elastic plates (23) laterally on the cambered battery cells (1);
    inserting the cambered battery cells (1) into the rigid module frame (15), from above or from below, through a second opening (25) in such a manner that the cambered battery cells (1) are pressed against one another; and
    closing off the second opening (25) by way of a pull plate (19).

* * * * *